Dec. 31, 1940.  W. R. WILEY  2,227,290

CLIP

Filed Sept. 19, 1939

INVENTOR
William R. Wiley.
BY
Harness, Dickey & Pierce.
ATTORNEYS.

Patented Dec. 31, 1940

2,227,290

UNITED STATES PATENT OFFICE 2,227,290

CLIP

William R. Wiley, Birmingham, Mich.

Application September 19, 1939, Serial No. 295,651

2 Claims. (Cl. 24—73)

The present invention relates to improved clips adapted for use in securing moldings to panel members, such as automobile body panels, and also to a novel method of applying such clips to said panels.

One of the primary objects of the invention is to provide improved clips of the type mentioned which are leak-proof after having been attached to a supporting panel.

Another object of the invention is to provide a novel method of applying clips of the type mentioned to a supporting panel in which the clips may be formed of cold rolled steel, thereby effecting economies in manufacture.

Another object of the invention is to provide an improved clip of the type mentioned in which the molding is resiliently attached to the clip through the resiliency of the molding.

Another object of the invention is to provide an improved clip having safety stops thereon so that the molding which is applied to the clip will not work loose therefrom.

Other objects of the invention will become apparent from the following specification, the drawing relating thereto, and from the claims hereinafter set forth.

In the drawing in which like numerals are used to designate like parts in the several views throughout:

Figure 1 is a fragmentary, cross-sectional view illustrating a molding attached to a supporting panel by means of a clip embodying features of the present invention;

Figure 1:
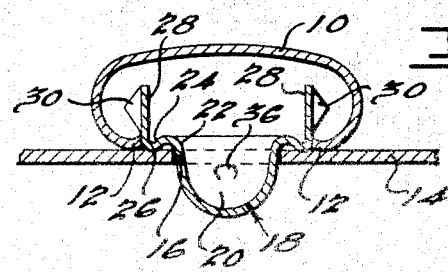
Figure 2:
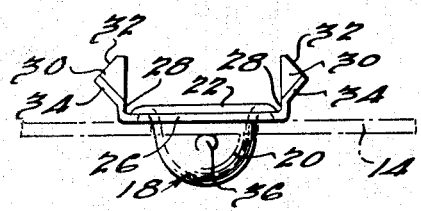
Figure 2 is an end elevational view of the clip construction illustrated in Fig. 1.
Figure 3:
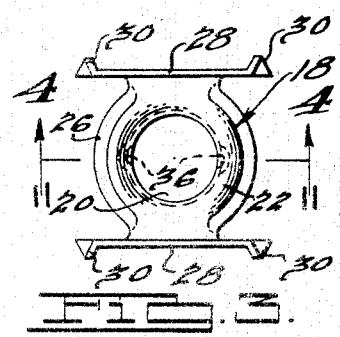
Fig. 3 is a top plan view of the clip illustrated in Figs. 1 and 2.
Figure 4:
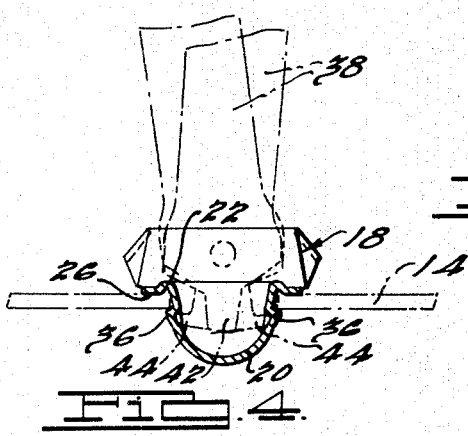
Fig. 4 is a cross-sectional view taken substantially along the line 4—4 thereof, and also illustrating in broken lines the method by which the clip is applied to the panel.

Referring to the drawing, and referring particularly to Figs. 1 through 5 thereof, a sheet metal channel shaped molding strip 10 is illustrated having inturned edges 12. It is, of course, to be understood that the strip 10 is elongated in shape and is adapted to be attached to a sheet metal panel 14, such as one of the body panels of an automobile, at spaced intervals along its length. The panel 14 is provided with a plurality of spaced openings or apertures 16, which in the embodiment illustrated are circular, along the line which the molding strip 10 is designed to occupy when in position.

The molding 10 is adapted to be secured to the panel 14 by means of clips, generally indicated at 18, which engage the molding strip 10 and engage the panel 14 through the openings 16. The clips 18 may be formed of cold rolled steel and comprise an imperforate bulbous base portion 20 having a cross-sectional configuration at the base thereof, which is indicated at 22, complementary in shape to the shape of the aperture 16. In the embodiment illustrated, such cross-sectional shape is circular so that when the bulbous portion 20 of the clip 18 is inserted through the aperture 16 the edge of such aperture is snugly engaged by the outer surface of the bulbous portion adjacent the base 22. The clip 18 is reversely bent, as indicated at 24, adjacent the base 22 so that a depending annular rib 26 is formed which snugly bears against the top surface of the panel 14.

A pair of upstanding, elongated attaching elements 28 are oppositely disposed and are integrally formed with the bulbous portion 20 adjacent the base thereof. The elements 28 are generally rectangular in form and have the ends thereof turned outwardly across the upper corners of the ends to provide outwardly extending wings or ears 30. Each of such wings 30 thereby forms an upper cam edge 32 which slopes outwardly and downwardly, and an under cam edge 34 which slopes downwardly and inwardly.

When the clip 18 is formed of cold rolled steel, the relative resiliency necessary between the molding engaging means on the clip and the molding is provided due to the inherent resiliency of the molding 10. Such molding 10, due to the character of the metal by which it is formed, and due to its construction, may be snapped over the wings 30 and securely held against the panel 14. That is, the molding may be placed above the cam edge 32 and such cam edge will force the facing edges of the flanges outwardly so that such edges will snap over the ears 32. The cam edges 34 will thus engage the facing edges of the flanges 12 and urge the molding 10 against the panel 14.

According to the present invention, before the molding 10 is attached to the clip in its position with respect to the panel 14, the clips 18 are first secured to the panel, and the bulbous portions

20 of the clips 18 are inserted through the apertures 16 so that the outer surface of such clips adjacent the bases thereof engage the edges of their respective apertures 16, and the annular ribs 26 bear against the surface of the panel 14 so that a snug and secure closure of the openings is effected. In order to then attach the molding to the panel portions of the bulbous portion 20 are deformed outwardly to provide projections 36 which tightly bear against the under surface of the panel 14 and lock the clips in position. These projections deform the metal of the base, but do not break through the metal, so that an imperforate base is provided.

Figure 5:
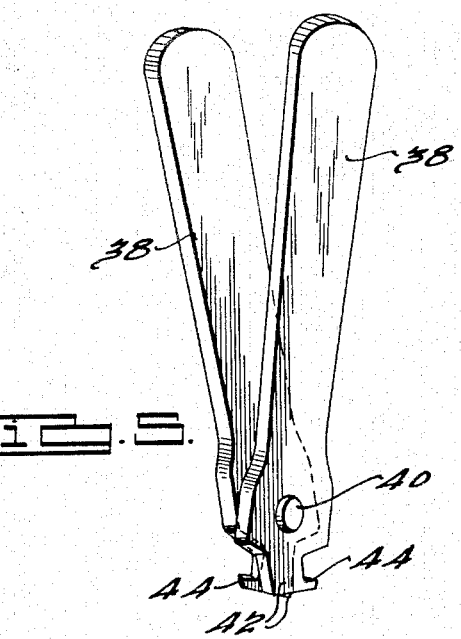
Fig. 5 is a perspective view of a tool which may be used to apply the clip as illustrated in Fig. 4.

A tool for practicing the method is illustrated in Fig. 5, which tool comprises a pair of arms 38, pivotally connected together adjacent one end thereof by means of a pivot pin 40. An actuating head is provided on each of the arms and such head comprises a reduced portion 42 having an outwardly extending projection 44. The projections 44, on the respective arms, face in opposite directions and the width of the heads 42 adjacent the lower ends thereof are slightly less than the diameter of the bulbous base portion 20 adjacent the base thereof. The tool can thus be positioned within the bulbous base portion 20 to the position shown by the broken lines in Fig. 4. By then drawing the handle portions 38 together, the projections 44 are caused to move outwardly against the inner wall of the bulbous base portion 20 and deform the base at diametrically opposed points in order to provide the projections 36 on the outer surface thereof. The clips are thus secured to the panel 14 within the aperture 16, and this deformation of the base 20 to form the projections 36 bearing against the undersurface of the panel 14 draws the rim or bead 26 tightly against the outer surface of the panel 14 and also draws the outer surface of the base portion 20 against the edge of the aperture 16 so that a tight, leak-proof seal is provided.

After the clips are secured within the panel 14, as described above, the molding 10 may then be applied to its position with respect to the panel over the ears 30, as also described above.

Figure 6:
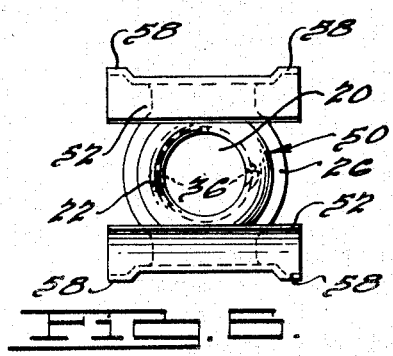
Fig. 6 is a top plan view of a modified form of clip construction embodying features of the present invention; and, Fig. 7 is an end elevational view of the clip illustrated in Fig. 6, and showing in broken lines the position of the clip with respect to the molding and panel.
Figure 7:
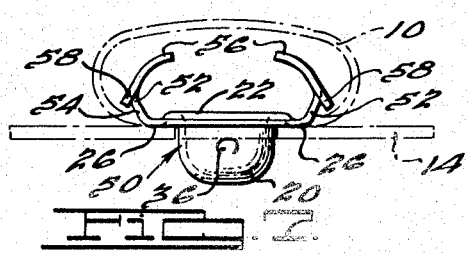

Referring to Figs. 6 and 7, a modified form of clip is generally indicated at 50. This clip 50 is generally similar to the clip 18 above described, except that the molding attaching elements are in a different form. That is the bulbous base portion 20 is provided having a base 22 and a bead or rim 26 which is positioned within the panel 14 in the same way as the clip above described, and is secured in the same way by means of the deformed projections 36. The molding attaching elements are illustrated at 52, which correspond to the elements 28 above described. The elements 52 are formed integral with the base portion 20 in the same relative position as the elements 28 above described.

The elements 52 are sloped upwardly and outwardly, as indicated at 54, and are then reversely turned so that they then slope upwardly and inwardly, as indicated at 56. The portions 54 correspond to the cam edges 34 above described, and the portions 56 correspond to the cam edges 32 above described, so that as the resilient molding 10 is applied to the clip it is caused to spring or ride outwardly over the cam edges formed by the portions 56, and then snapped over the cam edges formed by the portions 52, and securely held against the panel 14. In order to prevent displacement of the molding 10 with respect to the panel, stops 58 are formed on the elements 52, and such stops 58 may be formed by slotting the elements 52 inwardly from the ends thereof and from the lower edges thereof and then turning such ends outwardly. It will thus be seen that in the event that the inturned flanges 12 of the molding 10 tend to move outwardly, such flanges will abut against the flanges 58 and be locked against further movement in an outward direction.

From the above it will be seen that applicant has provided improved forms of leak-proof clip constructions, and has also provided a novel method of securing such clips to a supporting panel.

Formal changes may be made in the specific embodiments of the invention described without departing from the spirit and substance of the broad invention, the scope of which is commensurate with the appended claims.

What is claimed is:

1. A clip construction for anchoring a channel-shaped molding having inturned flanges to a panel having an aperture therein comprising a sheet metal member having a central portion adapted for locking engagement with the panel, wing portions formed integrally with said central portion, each of said wing portions extending laterally in opposite directions to provide portions adapted to engage the exterior surface of said panel, said wing portions diverging upwardly from said laterally extending portions to provide cam surfaces adapted to engage the flanges on said molding and retain the same in engagement with said panel and outwardly and downwardly extending projections near the upper end of said cam surfaces serving to provide safety catches to prevent withdrawal of said molding over the upper ends of said cam surfaces.

2. A clip construction for anchoring a generally channel-shaped molding having inturned flanges to a panel having an aperture therein, comprising a sheet metal member adapted for locking engagement with the panel, wing portions extending from said central portion on opposite sides of said wing portions each comprising a lateral portion, an upwardly and outwardly extending portion and an upwardly and inwardly extending portion, and tabs lying in the plane of said last mentioned portion extending below said upwardly and outwardly extending portion to provide safety catches.

WILLIAM R. WILEY.